US011427317B2

(12) United States Patent
Kuehn et al.

(10) Patent No.: US 11,427,317 B2
(45) Date of Patent: Aug. 30, 2022

(54) VEHICLE HAVING DRONE LANDING FUNCTIONALITY

(71) Applicant: Daimler AG, Stuttgart (DE)

(72) Inventors: Benjamin Kuehn, Backnang (DE); Martin Schmidt, Esslingen (DE); Thomas Wurdig, Ditzingen (DE)

(73) Assignee: Daimler AG, Stuttgart (DE)

( * ) Notice: Subject to any disclaimer, the term of this patent is extended or adjusted under 35 U.S.C. 154(b) by 815 days.

(21) Appl. No.: 16/330,742

(22) PCT Filed: Sep. 5, 2017

(86) PCT No.: PCT/EP2017/001049
§ 371 (c)(1),
(2) Date: Mar. 5, 2019

(87) PCT Pub. No.: WO2018/046124
PCT Pub. Date: Mar. 15, 2018

(65) Prior Publication Data
US 2022/0106036 A1    Apr. 7, 2022

(30) Foreign Application Priority Data

Sep. 6, 2016    (DE) .................... 10 2016 010 690.5

(51) Int. Cl.
*B64C 39/02*    (2006.01)
*G05D 1/06*    (2006.01)

(52) U.S. Cl.
CPC ......... *B64C 39/024* (2013.01); *G05D 1/0684* (2013.01); *B64C 2201/128* (2013.01); *B64C 2201/18* (2013.01); *B64C 2201/208* (2013.01)

(58) Field of Classification Search
CPC ............ B64C 39/024; B64C 2201/128; B64C 2201/18; B64C 2201/208; G05D 1/0684
See application file for complete search history.

(56) References Cited

U.S. PATENT DOCUMENTS 8,948,935 B1 * 2/2015 Peeters .................. G05D 1/102
709/201
9,056,676 B1 * 6/2015 Wang ........................ B60R 9/00
(Continued)

FOREIGN PATENT DOCUMENTS

| CN | 103914076 A | 7/2014 |
| CN | 104699102 A | 6/2015 |

(Continued)

OTHER PUBLICATIONS

Chinese Office Action issued in Chinese application No. 201780054359.9 dated May 21, 2021, with Partial English translation (Twenty Two (22) pages).
(Continued)

*Primary Examiner* — Richard M Camby
(74) *Attorney, Agent, or Firm* — Crowell & Moring LLP

(57) ABSTRACT

A vehicle includes a platform disposed on the roof of the vehicle for landing/launching an autonomously free-flying drone where the drone is set up and designed to receive/ deliver and transport an object. A first device determines a current position of the platform and/or the vehicle and a communication device directly or indirectly transmits data from the vehicle to the drone. The communication device transmits at least the current position of the platform and/or the vehicle to the drone.

1 Claim, 2 Drawing Sheets

(56) References Cited

U.S. PATENT DOCUMENTS

| | | | |
|---|---|---|---|
| 2012/0029735 A1 | 2/2012 | Bakker | |
| 2015/0344136 A1* | 12/2015 | Dahlstrom | B05B 13/005 |
| | | | 239/722 |
| 2015/0370251 A1 | 12/2015 | Siegel et al. | |
| 2016/0016663 A1 | 1/2016 | Stanek et al. | |
| 2016/0039542 A1* | 2/2016 | Wang | B60L 53/53 |
| | | | 244/114 R |
| 2016/0068267 A1* | 3/2016 | Liu | G05D 1/0088 |
| | | | 701/4 |
| 2016/0200438 A1* | 7/2016 | Bokeno | B64F 1/362 |
| | | | 244/2 |

FOREIGN PATENT DOCUMENTS

| | | |
|---|---|---|
| CN | 105398571 A | 3/2016 |
| CN | 105517664 A | 4/2016 |
| DE | 10 2014 213 023 A1 | 1/2016 |
| FR | 2 986 647 A3 | 8/2013 |
| KR | 10-2016-0089132 A | 7/2016 |
| WO | WO 2015/143977 A1 | 10/2015 |

OTHER PUBLICATIONS

PCT/EP2017/001049, International Search Report dated Dec. 18, 2017 (Three (3) pages).

\* cited by examiner

VEHICLE HAVING DRONE LANDING FUNCTIONALITY

BACKGROUND AND SUMMARY OF THE INVENTION

The invention relates to a vehicle, in particular a delivery vehicle, with drone landing functionality, a system for delivering objects with such a vehicle, and a method for operating an autonomously free-flying drone in such a system. The invention is used in particular in postal and parcel services, in the transport industry, in the field of medical care, in the field of breakdown assistance for vehicles, for the delivery of all kinds of goods, in particular food, supplies, etc.

The delivery of mail, parcels, goods, parts, tools, medicine, spare parts, etc., generally referred to as "objects", should increasingly take place at ever shorter intervals between order and delivery. The term "delivery" refers to the delivery of the respective object to the addressee. Nowadays the delivery of objects takes place by delivery vehicles, which are affected in particular by traffic jams, building sites, diversions, etc., and besides deliveries can only be made by driving to addresses which are accessible via a road traffic route network, the time intervals between an order and a delivery of an object cannot be further optimized today.

The objective of the invention is to specify a vehicle as well as a system with such a vehicle, which enables faster delivery/collection of objects even in areas that are not easily accessible with an existing road network.

A first aspect of the invention relates to a vehicle, comprising: one on the roof of the vehicle arranged platform for the landing/launching of an autonomously free-flying drone, wherein the drone is set up and designed to receive/deliver and transport an object, a first device which is adapted to detect a current position of the platform and/or the vehicle, and a means of communication for direct communication with the direct or indirect data transmission from the vehicle to the drone, wherein the communication means transmits at least the current position of the platform/vehicle to the drone.

The term "drone" is used here to describe an unmanned aerial vehicle which is free-flying and autonomously controllable. The drone has the following advantageous features via one or more drives, a control system for the control of the drives and, if applicable, control surfaces, a unit for detecting a current position as well as a navigation system for storing and executing a flight plan through the control system. The drone is advantageously controlled by an operator that delivers objects to the vehicle and/or collects objects from the vehicle. The delivery or collection takes place advantageously after requirement/initiation either of the vehicle or of the operator or of a user at the vehicle or at the operator.

The term "direct data transmission" in this context refers to a direct data transmission from the vehicle to the drone. The term "indirect data transmission" refers to data transmission from the vehicle to the drone via one or more intermediate stations.

The platform is used to land the drone on the roof of the vehicle. The platform preferably comprises a flat surface. The surface should preferably be designed to be as non-slip as possible. For this purpose, it comprises a corresponding roughness or surface structure. The platform preferably comprises a peripheral edge that does not project beyond the side of the vehicle. In a simple design example, the entire roof surface of the vehicle is shaped as a platform.

The first device shall preferably comprise a satellite-based position determination system (e.g., GPS, Galileo, GLONASS, etc.). Preferably the first device makes it possible to determine a position with an accuracy of position in the centimeter range. The first device comprises in particular a differential GPS, which has a positional accuracy in the centimeter range. An additional measuring instrument, e.g., a compass or magnetometer, is used to further determine the position, for use.

For the approach of a drone, it is particularly important to indicate the landing position on the platform in three dimensions (x, y, z) with high positioning accuracy. The landing position can be calculated from the determined position of the position sensor of the first device in the vehicle and its known relative distance to the landing position on the platform can be determined.

The proposed vehicle therefore constitutes in principle a mobile landing platform for a free-flying autonomously controlled drone. The vehicle is equipped with a means of communication via which at least the current position and condition of the mobile landing platform/the vehicle, in particular the landing position on the platform is transmitted to the drone.

In a further development, the means of communication for data transmission is wireless with a mobile unit, via which the current position of the platform/the vehicle is transmitted to the drone. In this case, data is transmitted indirectly to the drone. The mobile unit is preferably a smartphone, a mobile computer, a notebook, etc. The mobile unit is preferably designed and set up by means of an app to transmit drone requests, object orders, delivery coordinates, delivery times, object collection coordinates, times of collection, etc., to a provider that uses drones to collect objects or deliver objects. The entire delivery logistics, from order to delivery, is advantageously controlled by this app or at least can be tracked in its course. Advantageously, the app allows a user to intervene in a planned delivery process, for example by changing a desired delivery time, a desired delivery location, a desired location for collecting an object, a desired collection time, etc.

The mobile unit is advantageously networked with the vehicle's means of communication as well as an operator's and drone's means of communication, so that information can be exchanged between the network participants. Networking is advantageously achieved via a data cloud.

The vehicle's means of communication preferably uses mobile radio networks such as GSM, LTE or WLAN connections for communication. Of course, all other known communication methods are also included in the inventive idea.

An advantageous further development of the vehicle is characterized in that a second device is present on the vehicle, which in the half-space above the platform scans for obstacles and determines the first data on detected obstacles, wherein the means of communication transmits the first data on detected obstacles to the drone. Advantageously, the second device comprises a laser scanner, a radar scanner, a stereo camera, a 3D camera, an ultrasonic scanner or a combination thereof. Also advantageous are the first data room areas of the half-space in which detected obstacles are present. The drone comprises a control or navigation system, which automates an automatic flight route planning and flight execution depending on the first data received. In this way, it can be prevented that the drone during the landing approach or departure from the platform of the vehicle collides with obstacles.

An advantageous further development of the vehicle is characterized in that the vehicle comprises a transmitter which emits a locating signal and/or a flight guidance signal for an automated landing of the drone on the platform, wherein the locating signal and/or the flight guidance signal directs the drone to a landing position on the platform. The locating signal or the flight guidance signal can be an electromagnetic signal, an optical signal, an infrared signal, an acoustic signal, in particular an ultrasonic signal, or a combination thereof. Advantageously, the locating signal or the flight guidance signal provides a fine adjustment during the landing approach of the drone onto the platform or during the departure of the drone from the platform.

An advantageous further development of the vehicle is characterized in that the vehicle comprises an optical and/or an acoustic signaling means for outputting a signal perceived in an environment of the vehicle, the warning signal activated by a signal second control means beforehand if a drone approaches the platform or departs from the platform. It is advantageous to activate the signal a pre-set time span before a planned landing, a drone approaching the platform or a pre-set time span before a planned launch of a drone from the platform, in particular to warn persons in the vicinity of the vehicle of a drone departing or approaching in the near future. Advantageously, the time span is selected to be 1 min or 2 min or 3 min or 4 min or 5 min.

The vehicle's means of communication and a drone's means of communication are advantageously set up and designed in such a way that one or a plurality of the following information is transmitted:

Information from the drone to the vehicle:
identification of the drone,
drone's position,
drone target location/target vehicle,
purpose of the drone flight (delivery/collection of a package from the drone to the vehicle/from the vehicle),
arrival time of the drone,
type of transported object,
object-specific information,
drone error message.
Information from the vehicle to the drone:
identification of the vehicle,
ready status for landing/launching the drone on/from the platform,
error message from the vehicle,
position and condition of the vehicle or loading platform,
target location of the drone after relaunching the drone from the platform.

A second aspect of the invention relates to a system at least comprising: a vehicle, as described above, a drone base to provide an autonomously free-flying drone and, where appropriate, to equip the drone with one or a plurality of objects to be transported by the drone, a base station being arranged at the drone base, as well as a mobile unit. The vehicle, the drone, the base station and the mobile unit are networked for data exchange. The mobile unit is designed and set up for inputting a request from a drone to deliver an object specified by a user of the mobile unit from the drone base to the vehicle and/or for inputting a request from a drone to collect an object specified by the user of the mobile unit from the vehicle to the drone base and for transmitting the requests to the base station.

The drone is designed and set up to launch from the drone base or any other predetermined location, to fly to the vehicle, to land on the platform, to launch from the platform to any predetermined location, or to fly to the drone base to land there. It is advantageous that the launch and destination points for the drone can be specified at will. It is advantageous to have a communication or a data connection to the drone at all times during drone operation. If or when the drone is to be used in areas where it is known that there is no communication link to the drone, it shall be controlled in accordance with a specified flight plan, assuming that direct communication between the vehicle and the drone is always possible within the area of the vehicle.

Furthermore, the drone is designed and set up to receive and evaluate first data, the drone comprising a first control means which autonomously controls the drone during approach/departure to/from the platform depending on the received first data.

The proposed system enables the transport of objects from the drone base to the vehicle with the drone, the collection of objects from the vehicle and the transport of the object to a given delivery position or at the drone base.

The control of the drone logistics, i.e., the requirement of the drone with or without a specified object to be transported, is advantageously achieved by means of an app on the mobile unit. If, for example, a craftsman, a service provider, etc., is traveling with a vehicle of such a type, and if he/she needs a spare part, etc., from a provider, then the craftsman or service provider, etc., can request the ordering and delivery of the missing object from the provider, who is at the same time the operator of drones, by making a corresponding entry in his/her mobile unit. The order is transmitted to the provider's base station, so that the operator provides the desired object including the drone, transmits the corresponding delivery coordinates to the drones, and launches the drone for automated flight to the vehicle. The base station is particularly a computer with an output or display unit.

In particular, the system enables the delivery and collection of objects from and to the vehicle irrespective of traffic jams, detours, etc. In particular, if a plurality of drones is used, the system enables delivery of objects from the vehicle, particularly to delivery addresses that are not easily accessible via a road network.

Advantageously, the drone is designed and set up to receive and process the locating/flight guidance signal, the first control means controlling the drone during approach/departure to/from the platform depending on the received locating/flight guidance signal.

Another aspect of the invention relates to a method of operating an autonomously free-flying drone in a system, as described above, with the following steps. In a first step, a request is made for a drone to deliver at least one object predetermined by a user of the mobile unit from the drone base to the platform of the vehicle, and/or a request is made for a drone to collect an object predetermined by the user of the mobile unit from the vehicle to the drone base by inputting a corresponding request into an input interface of the mobile unit. In a second step, the entered request is transmitted to the base station. It is advantageous to display or output the request at the base station. In a third step, on the basis of the request received at the base station, the drone is provided and, if necessary, equipped with the specified object at the drone base. This step can be carried out manually by an operator and advantageously is also fully automated.

In a fourth step, the drone is launched, the drone flies autonomously from the drone base to the vehicle, and the drone lands autonomously on the platform, wherein the drone is designed and set up to receive and process the first data, and wherein the drone has a first control means which autonomously controls the drone during approach/departure to/from the platform depending on the received first data and the locating signals and/or the flight guidance signals.

Additional advantages, features and details result from the following description, in which at least one example of design is described in detail, possibly with reference to the drawings. Same, similar and/or functionally identical parts have the same reference marks.

DETAILED DESCRIPTION OF THE DRAWINGS

Figure 1:
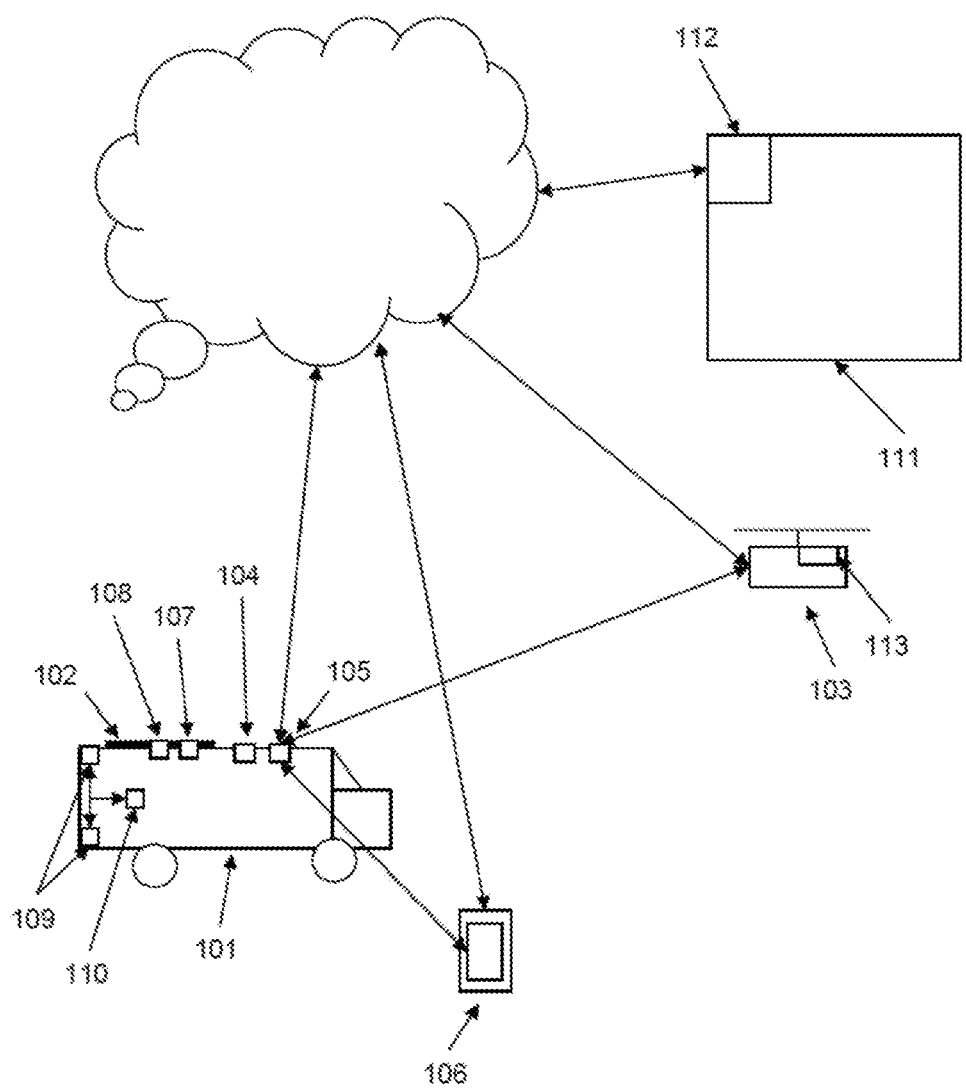
FIG. 1 shows a schematic representation of a system according to the invention with a vehicle according to the invention.

FIG. 1 shows a schematic representation of a system according to the invention with a vehicle according to the invention 101.

The vehicle 101 comprises a platform 102 arranged on the roof of the vehicle 101 for landing/launching an autonomously free-flying drone 103, the drone 103 being set up and designed to receive/deliver and transport an object (not shown); a differential GPS system 104 determining a current position of the platform 102; communication means 105 for directly or indirectly (via a data cloud symbolically shown as a cloud) transmitting data from the vehicle 101 to the drone 103, the communication means 105 transmitting at least the current position of the platform 102 to the drone 103. Thereby the target coordinates of the vehicle or the platform are transmitted to the drone.

The communication means 105 is also wirelessly connected to a mobile unit 106, in this case a smartphone, for data transmission. An app is installed on the smartphone that enables a smartphone user to order goods from a provider by delivering drones to the vehicle. For this purpose, the app transmits to a base station 112 (computer) of the provider 111 (drone base) the order of the respective goods (object), which are to be delivered by drone to the current position of the platform 102/vehicle 101. The communication means 105 continues to transmit the current position of the platform 102/vehicle 101 to the drone, especially if the drone with the ordered object has been launched by the provider.

The vehicle 101 also has a second device 107, a 3D laser scanner, which scans the half-space above the platform 102 for obstacles and detects first data on detected obstacles, wherein the first data define areas of the half-space in which detected obstacles are present and wherein the communication means 105 transmits the first data on detected obstacles to the drone 103.

The vehicle 101 also has a transmitter 108 that emits a locating signal for an automated landing of the drone 103 on the platform 102, with the locating signal precisely directing the drone 103 to a landing point on the platform 102.

Finally, the vehicle 101 comprises an optical and acoustic signaling means 109 for emitting an optical and acoustic warning signal perceptible in an environment of the vehicle 101, which is activated three minutes in advance by a second control means 110 present in the vehicle 101 if a drone 103 approaches the platform 102 or departs from the platform 102. In particular, persons present in the vicinity of the vehicle are warned against drone flight operations.

Figure 2:
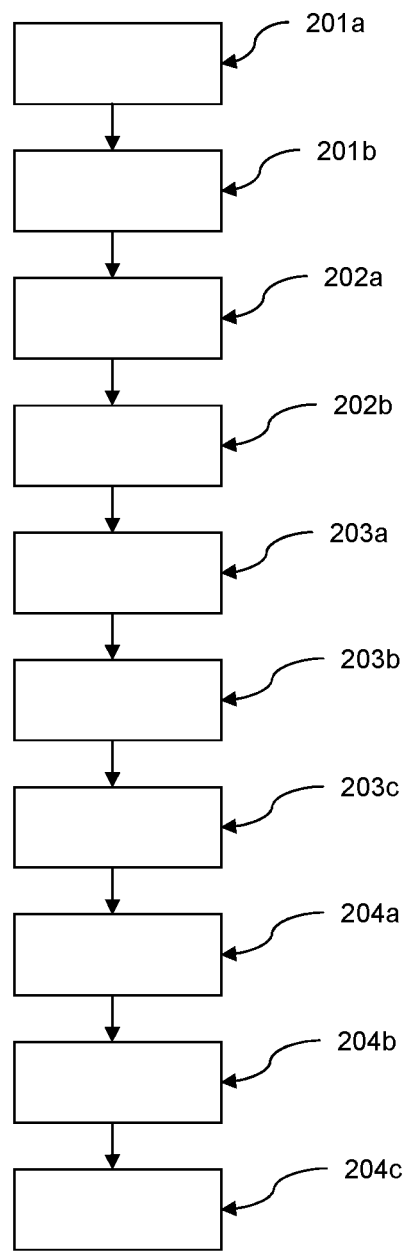
FIG. 2 shows a schematic flowchart of an inventive method for operating an autonomously free-flying drone in a system according to FIG. 1.

FIG. 2 shows a schematic flowchart of a method according to the invention for the operation of an autonomously free-flying drone in a system according to FIG. 1.

In a step 201a, a request is made for a drone 103 to deliver at least one object specified by a user of the mobile unit 106 from the drone base 111 to the platform 102 of the vehicle 101 from the drone base 111 to the platform 102 of the vehicle 101 by an input into the mobile unit 106, in a step 201b, the request is transmitted 201b to the base station 112 of a drone base 111. In a step 202a, the drone 103 is provided at the drone base 111 on the basis of the request received at the base station 112, and in a step 202B, the drone 103 is equipped with the specified object. In step 203a the drone (103) is launched, in step 203b the drone 103 flies autonomously from the drone base 111 to vehicle 101, in step 203c the drone 103 lands autonomously on platform 102 of the vehicle 101, wherein the drone 103 is designed and set up to receive and process the first data, and wherein the drone 103 comprises a first control means 113 which autonomously controls the drone 103 during approach/departure to/from the platform 102 depending on the received first data and the locating signals and/or the flight guidance signals.

After the drone 103 has landed on platform 102, a user can remove the object transported by the drone 103. The ordered object is now delivered. Once this has been done, the user enters via his smartphone that the drone 103 can now return to the drone base 111. This information is transmitted to the drone 103.

After this information is present in the drone, the drone 103 is launched from the platform 102 in one step 204a, the drone 103 is autonomously flying back to the drone base 111 in one step 204b, and the drone 103 is autonomously landing at the drone base 111 in one step 204c.

Although the invention is illustrated in detail by preferred design examples and has been explained, the invention is not limited by the disclosed examples and other variations can be derived from it by the expert, without leaving the scope of protection of the invention. It is therefore clear that a large number of variation possibilities exists. It is also clear that the examples are really only examples, which are not in any way to be considered as limitations of, for example, the scope of protection, the possible applications or the configuration of the invention. Rather, the preceding description and the figure descriptions enable the expert to concretely implement the exemplary embodiment, wherein the expert, aware of the disclosed idea of invention, can make numerous changes, for example with regard to the function or arrangement of individual elements named in an exemplary embodiment, without leaving the scope of protection defined by the claims and their legal correspondences, such as further explanations in the description.

The invention claimed is:

1. A method of operating an autonomously free-flying drone in a system:
   wherein the system comprises:
      a vehicle;
      a drone base with a base station;
      the autonomously free-flying drone; and
      a mobile unit;
      wherein the vehicle, the base station, the drone, and the mobile unit are networked with each other for data exchange;
      wherein the mobile unit is configured to input a first request to deliver an object specified by a user of the mobile unit from the drone base to the vehicle and/or to input a second request to collect an object specified by the user of the mobile unit from the vehicle to the drone base, and to transmit the first and the second requests to the base station;

wherein the drone is configured to launch from the drone base, to fly autonomously to the vehicle, and to land autonomously on the platform;

wherein the vehicle comprises:

a platform disposed on a roof of the vehicle for landing and launching the autonomously free-flying drone, wherein an object is receivable and/or deliverable and transportable by the drone;

a position determination device, wherein the position determination device determines a current position of the platform and/or of the vehicle;

a communication device, wherein data is directly or indirectly transmittable from the vehicle to the drone by the communication device and wherein at least the current position of the platform and/or of the vehicle is transmittable by the communication device to the drone; and a scanning device, wherein a half-space above the platform is scannable by the scanning device to detect an obstacle and wherein first data on a detected obstacle is determinable by the scanning device;

wherein the first data is transmittable by the communication device to the drone, and comprising the steps of:

requesting the drone for delivering an object specified by a user of the mobile unit from the drone base to the platform of the vehicle by entering a corresponding request in an input interface of the mobile unit;

transmitting the corresponding request to the base station;

receiving the corresponding request at the base station and, on a basis of the received corresponding request, providing the drone;

launching the drone, autonomously flying the drone from the drone base to the vehicle, autonomously landing the drone on the platform, and delivering the object by the drone, wherein the drone receives and processes the first data and a locating signal and/or a flight guidance signal transmitted from the vehicle, and wherein the controller autonomously controls the drone during the approach and the departure depending on the received first data and the locating signal and/or the flight guidance signal.

* * * * *